US011519867B2

(12) United States Patent
Hofman et al.

(10) Patent No.: US 11,519,867 B2
(45) Date of Patent: Dec. 6, 2022

(54) X-RAY-BASED DETERMINING OF WEIGHTS FOR COATED SUBSTRATES

(71) Applicant: HONEYWELL INTERNATIONAL INC., Morris Plains, NJ (US)

(72) Inventors: Gertjan Hofman, Vancouver (CA); Tobias Nebel, North Vancouver (CA); Sebastien Tixier, North Vancouver (CA); Michael Hughes, Vancouver (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 472 days.

(21) Appl. No.: 16/707,374

(22) Filed: Dec. 9, 2019

(65) Prior Publication Data
US 2021/0172888 A1    Jun. 10, 2021

(51) Int. Cl.
*G01B 15/02* (2006.01)
*G01N 23/083* (2018.01)
(Continued)

(52) U.S. Cl.
CPC ......... *G01N 23/083* (2013.01); *G01B 15/025* (2013.01); *G01G 9/005* (2013.01); *H01M 50/403* (2021.01)

(58) Field of Classification Search
CPC .... G01N 23/083; G01N 23/04; G01B 15/025; G01G 9/005; H01M 50/403; Y02E 60/10
See application file for complete search history.

(56) References Cited

U.S. PATENT DOCUMENTS

| 4,845,730 A * | 7/1989 | Mercer ............... G01N 23/083 378/53 |
| 5,795,394 A | 8/1998 | Belotserkovsky et al. |

(Continued)

FOREIGN PATENT DOCUMENTS

| CN | 101346625 A | 1/2009 |
| CN | 101405592 A | 4/2009 |

(Continued)

OTHER PUBLICATIONS

Coats et al., "Combined X-ray/Beta sensor advances nuclear gauging technology", IEEE Transactions on Instrumentation and Measurement, vol. IM-33, No. 3, pp. 159-163. (Year: 1984).*

(Continued)

*Primary Examiner* — Kiho Kim
(74) *Attorney, Agent, or Firm* — John Maldjian; Stevens & Lee PC

(57) ABSTRACT

A measurement apparatus includes an x-ray sensor including an x-ray source having a high voltage power supply for emitting an x-ray spectrum and an x-ray detector for providing a measured x-ray signal value responsive to the x-rays received after transmission through a coated substrate including a sheet material having a coating material thereon. A second sensor is a beta gauge or infrared sensor for providing a second sensor signal that includes data for determining a total weight per unit area of the coated substrate or of the sheet material A computing device receives the measured x-ray signal value and the second sensor signal configured to implement an x-ray based calculation that utilizes absorption coefficients for the coating material and sheet material, the measured x-ray signal value, the x-ray spectrum, and the weight measure as a calculation constraint, for computing at least the weight per unit area of the coating material.

14 Claims, 2 Drawing Sheets

(51) Int. Cl.
*G01G 9/00* (2006.01)
*H01M 50/403* (2021.01)

(56) References Cited

U.S. PATENT DOCUMENTS

| | | | |
|---|---|---|---|
| 7,376,215 | B2 | 5/2008 | Hofman |
| 7,382,456 | B2 | 6/2008 | Tixier et al. |
| 2003/0113442 | A1* | 6/2003 | Jan ...................... H01M 4/0416 429/94 |
| 2010/0159121 | A1 | 6/2010 | Meijer Drees et al. |

FOREIGN PATENT DOCUMENTS

| | | |
|---|---|---|
| CN | 102944498 A | 2/2013 |
| CN | 102967529 A | 3/2013 |
| CN | 103837491 A | 6/2014 |
| CN | 108344489 A | 7/2018 |
| EP | 1783250 A2 | 5/2007 |

OTHER PUBLICATIONS

Chinese Office Action and Search Report dated Apr. 15, 2022, issued in connection with corresponding Chinese Application No. 202011249690.6 with English language translation (25 pages total).

* cited by examiner

X-RAY-BASED DETERMINING OF WEIGHTS FOR COATED SUBSTRATES

FIELD

Disclosed embodiments relate to an apparatus for measuring weights for a coated substrate, such as a coated membrane or a coated sheet.

BACKGROUND

Ceramic-coated polyethylene (PE) or polypropylene (PP) separator membranes are important components for the performance of lithium-ion batteries (LiBs). The separator-membrane provides an ion-permeable barrier between the cathode and the anode. These membranes are porous and if uncoated generally start to degrade at temperatures of around 120° C. causing the LiB to short-circuit and thus fail. A ceramic coating (e.g. $Al_2O_3$) applied on the membrane is known to help to improve the separator's temperature-stability to up to about 200° C. At high temperatures, the coated separators become impermeable which precludes their operation, but this also prevents thermal runaway events.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize online weight per unit area measurement for coated substrates, such as for coated separator membranes for LiB's is a desired quality control measurement. Conventional weight sensing for coated substrates is complicated since it requires characterizing numerous calibration samples that have a well-known and uniform membrane and coating thickness.

Disclosed aspects include a measurement apparatus for determining the weight per unit area of at least the coating material on a sheet material of a coated substrate by including an x-ray sensor that provides a measured x-ray signal value, and a second sensor comprising a beta gauge or an infrared (IR) sensor that provides a second sensor signal which contains data for determining the total combined weight per unit area of the coated substrate, or a weight per unit area of the sheet material. The measurement apparatus implements a disclosed x-ray based calculation that utilizes absorption coefficients for the coating material and for the substrate, the measured x-ray signal value, the x-ray spectrum, and the weight measure which can be determined directly by the second sensor, or the computing system can itself also determine the weight measure when provided the second sensor signal. The substrate of the coated substrate when referred to itself herein is generally termed a "sheet material".

The use of the weight measure provided directly by the second sensor or indirectly by the second sensor signal allows the disclosed x-ray based calculation to provide at least one of the weight per unit area of the coating material and a weight per unit area of the sheet material which enables the providing of a complete determination of both the weight per unit area of the sheet material and the weight per unit area of the coating material. When the second sensor comprises a beta gauge, the beta gauge provides a second sensor signal that includes data for obtaining a total weight of the coated substrate (the weight of the sheet material plus the weight of the coating material). This total weight of the coated substrate is used to mathematically constrain the disclosed x-ray based calculation.

When the second sensor comprises an IR sensor, the second sensor signal includes data for obtaining the weight per unit area of only the sheet material, which generally comprises a polymer. This weight per unit area measurement of the sheet material is then used to mathematically constraint the x-ray based calculation to enable one to determine the weight per unit area of the coating material, and thus the total weight per unit area of the coated substrate because the total weight per unit area of the coated substrate clearly equals the sum of the weight per unit area of the coating material and the weight per unit area of the sheet material. This disclosed x-ray calculation-based method avoids the need for the conventional difficulty to properly prepare numerous calibration samples as described above.

DETAILED DESCRIPTION

Figure 1:
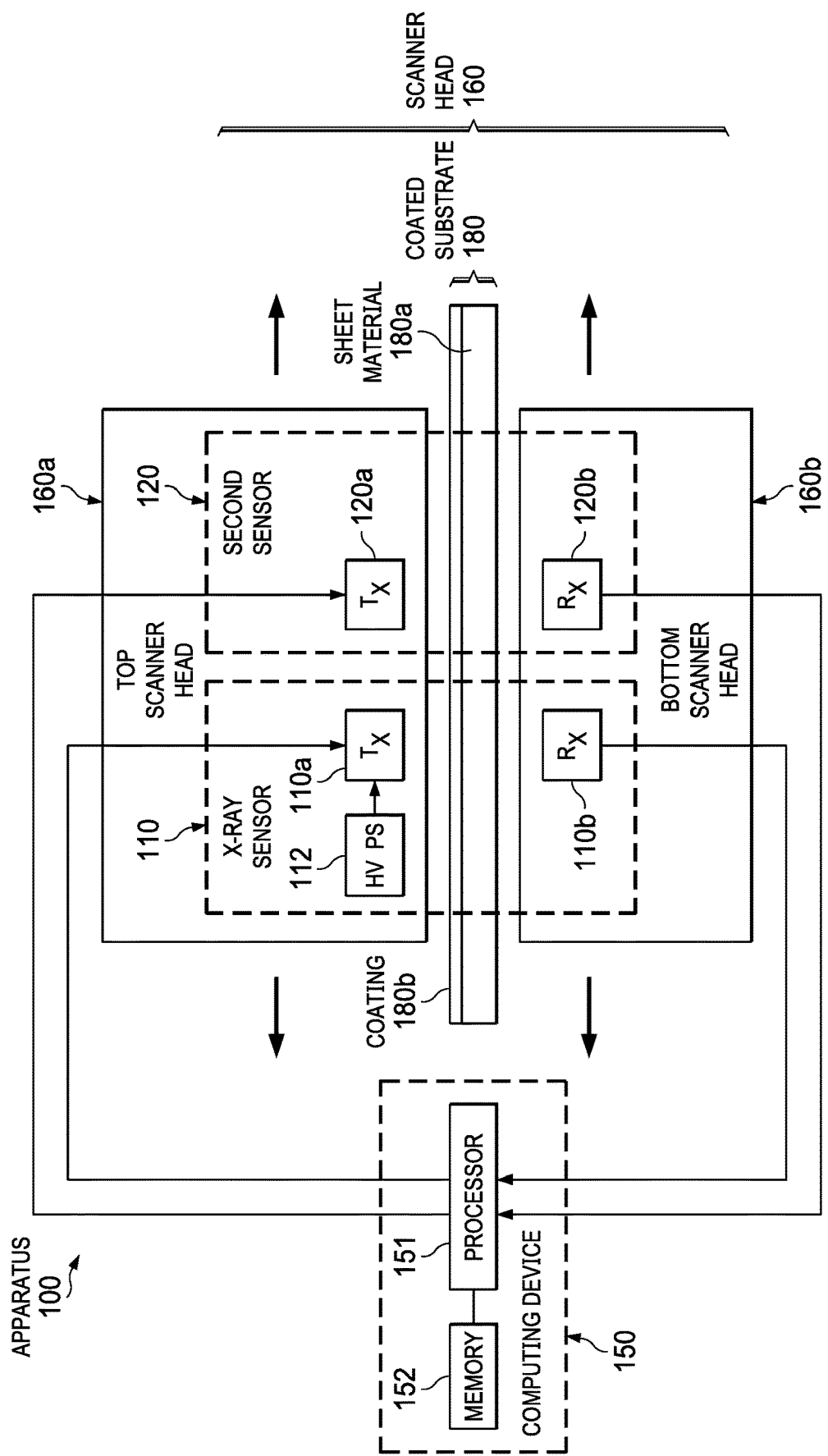
FIG. 1 is depiction of an example measurement apparatus including an x-ray sensor and second sensor comprising a beta gauge or an IR sensor for simultaneously calculating a weight per unit area of a coating material, and a weight per unit area of a sheet material.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

Beta gauges measure mostly the total weight (or mass) of a coated substrate that comprises a coating material on a sheet material, where the coating material for a LiB generally comprises a high-z coating such as aluminum oxide. The high-z material generally in the coating 180b is defined herein to have at least one atomic species with an atomic number that is at least that of aluminum, which has an atomic number of 13.

The x-ray sensor's response depends strongly on the atomic number of the elements in the coated substrate, meaning it will be mostly sensitive to the coating material in the case of a high-z coating, typically a high-z ceramic coating. It is recognized that one can predict an x-ray sensor's response (including for x-rays passing through a coated substrate) to a very high accuracy, so that no calibration is needed for the x-ray sensor. It is also recognized that respective materials in a coated substrate comprising a coating material on a sheet material such as a polymer, have a distinct x-ray absorption spectrum. As disclosed herein, the x-ray sensor's response can be calculated without any need for the above-described conventional calibration by knowing the composition of the coating material, which for LiB's is typically aluminum oxide ($Al_2O_3$). This disclosed x-ray based calculation relies on intimate knowledge of the x-ray wavelengths produced by the x-ray sensor together with a generally publicly available database of absorption coefficients for both the coating material and for the sheet material.

Disclosed methods generally begin with an x-ray spectrum calculated for the specific type of x-ray tube used, and the specific high-voltage operating condition used. Some initial thickness can be assumed for the coating material 180$b$ and for the sheet material 180$a$. One then calculates a predicted x-ray signal value based on the transmitted energy distribution for comparison to the measured x-ray signal value. Weight (per unit area) values for the respective layers (the coating material and the sheet material) are then generally iterated until the predicted x-ray signal sufficiently closely matches the measured x-ray signal value. Mathematical Chi-squared minimization techniques can be used to speed up this above-described iterative calculation process.

The iterative constrained x-ray based calculation-based method can proceed automatically by beginning with an initial weight per unit area for the coated substrate 180, then calculating a predicted x-ray signal value that utilizes the absorption coefficients for the coating material and for the sheet material, the x-ray spectrum, and a composition for the coating material. This calculation for the predicted x-ray signal value then adjusts the weight per unit area for the coated substrate 180 upwards in the case the predicted x-ray signal value is too low relative to the measured x-ray signal value, or adjusts the weight per unit area for the coated substrate 180 down in the case the predicted x-ray signal value is too high relative to the measured x-ray signal value, and then recalculates an updated predicted x-ray signal value. The adjusting of the weight per unit area of the coated substrate are then repeated until a final updated predicted x-ray signal value is determined to sufficiently match the measured x-ray sensor value There may be at least one complication with the above-described x-ray based calculation process. One complication may be that the measured x-ray signal value provides only a combined response of the sheet material (typically a plastic) and the coating material (e.g., high-z coating layer). From the measured x-ray signal value alone, one cannot tell whether the coated substrate (coating material and the sheet material) comprises 30 grams per square meter (gsm) of plastic with 5 gsm of aluminum oxide, or comprises 50 gsm of plastic with 2 gsm of aluminum oxide. The second sensor 120 comprising a beta gauge or an IR sensor as described above provides data for obtaining a weight measure for the coated substrate comprising a total weight per unit area of the coated substrate or a total weight per unit area of the sheet material that constrains the x-ray based calculation process. This weight measure is mathematically included as a constraint in the iteration process resulting in a unique set of weight measurements. In the example above, the total weights were 35 and 52 gsm respectively, which each produce a significantly different response as seen by the beta gauge or by the IR sensor.

A second possible complication may be that the combined uncertainty in the model of the x-ray tube spectrum, the absorption coefficients (e.g., from the public National Institute of Standards and Technology (NIST) database), and the x-ray detector characteristics may result in insufficient accuracy for particular user's application. In this case, a 'calibration sheet' can be utilized. In the case that the coating material comprises aluminum oxide, the calibration sheet may comprise pure aluminum, or another material besides aluminum oxide, but generally a very thin material whose basis weight is known to high accuracy. This calibration sheet will generally not be same material as the coating material (e.g. aluminum versus aluminum oxide), but a calculation can be used to compensate for this material difference without requiring any on-site calibration. One can measure this calibration sheet after assembly of the x-ray sensor, and apply any corrections that may be used to make sure the model provides a satisfactory answer.

The disclosed x-ray based calculation is computationally intensive but not complex, and can generally be carried out by a suitable computing device, such as a personal computer (PC) available on some commercially available scanner systems. FIG. 1 is a depiction of an example disclosed measurement apparatus 100, where the coated substrate shown as 180 is shown comprising a coating material 180$b$ that can comprise a high-z material on a sheet material 180$a$.

The sheet material 180$a$ as noted above can comprise a polymer or layers of polymers (e.g., polyethylene (PE), or PP). The coating material 180$b$ can comprise a ceramic material such as particles of $Al_2O_3$, $SiO_2$, or $ZrO_2$. The coating material 180$b$ is generally a layer not solely comprised of high-z ceramic particles, but can also generally include a binder material.

The measurement apparatus 100 is configured to compute at least the weight per unit area of the coating material of the coated substrate 180. As noted above, the other relevant individual weight is the weight per unit area of the sheet material 180$a$. As described above, since the total weight per unit area of the coated substrate 180 equals the sum of the weight of its coating material 180$b$ and sheet material 180$a$ components, any one of these 3 weights may be determined from the other 2 weights.

A scanner head 160 comprises a top scanner head 160$a$ and a bottom scanner head 160$b$, that has two sensors therein, one of them an x-ray sensor 110 and a second sensor 120 that comprises an IR sensor or a beta gauge. As shown, transmitters shown as Tx 110$a$ and Tx 120$a$ are in the top scanner head 160$a$, and receivers shown as Rx 110$b$ and Rx 120$b$ are in the bottom scanner head 160$b$. Inside the scanning heads 160$a$, 160$b$, the respective sensors 110, 120 are mounted along a line that can either be parallel to the machine direction (MD) or oriented in a cross direction (CD). The scanner heads 160$a$, 160$b$ can scan across the coated substrate 180 sometimes referred to as a web to develop a representation of the coated substrate 180 which is moving between the scanning heads 160$a$, 160$b$. Control of the position of the scanner head 160 is well-known. The scanner head 160 can scan over part of the width or the entire width of the coated substrate 180.

A beta gauge as known in the art is a device for measuring the thickness or weight of a material based on the material's absorption of beta rays which are fast-moving electrons emitted by the radioactive decay of certain radioactive materials. A beta gauge includes a source of beta radiation such as Kr-85, Sr-90, or Pm-147, and being a transmission-based sensor has a radiation detector (or receiver) positioned on an opposite side of the coated substrate 180 relative to the beta source, shown as Rx 120$b$, where the beta gauge that can measure the weight per unit area of various materials, such as plastics, paper, and metal and associated composite materials. The scanner head 160 is used to scan the respective sensors 110, 120 over the coated substrate 180 after the coating material 180$b$ has been applied to the sheet material 180$a$.

The x-ray sensor 110 includes an x-ray source shown as a Tx 110$a$ that generally comprises an x-ray tube having a high-voltage power supply shown as HV PS 112 coupled thereto is for emitting an x-ray spectrum comprising x-rays at a plurality of energies, and an x-ray detector shown as Rx 110b for providing a measured x-ray signal value responsive to the x-rays received after being transmitted through a coated substrate 180 comprising a sheet material 180a including a coating material 180b. The x-ray spectrum is generally calculated from a physics model for a specific x-ray tube at a specific high-voltage condition.

The x-ray sensor 110 operated at a high-voltage (e.g., 4 kV to 10 kV) provides a measured x-ray signal value which, due to higher density and higher atomic numbers, is about 5 to 10 times more sensitive to the coating material 180b weight than to the weight of the sheet material 180a in the case of a LiB generally being a plastic membrane. Alternatively, when the second sensor 120 comprises an IR sensor, the IR sensor will provide a weight measure which is mostly sensitive to the sheet material 180a weight (e.g. comprising PE), that is generally thus insensitive to the weight of the coating material 180b.

A computing device 150 is coupled to receive the measured x-ray signal value from the x-ray sensor 110 and the second sensor signal from the second sensor 120 that includes data for obtaining weight measure. The computing device 150 includes a processor 151 that has an associated memory 152, where the processor 151 is configured to implement a disclosed x-ray based calculation. The x-ray based calculation utilizes absorption coefficients for the coating material 180b and for the sheet material 180a (absorption coefficients as a function of x-ray energy for a variety different materials are available from the public NIST database), the measured x-ray signal value, the x-ray spectrum, and the weight measure as a calculation constraint, for computing at least the weight per unit area of the coating material.

Measured signals from the Rx's 110b, 120b as known in the art are processed by electronics (not shown) including an electronic filter, an analog-to-digital converter (ADC), and an amplifier. After processing by the ADC, the resulting digital signal is then conveyed to the computing device 150.

Regarding the disclosed iterative constrained x-ray based calculation method, an initial (a theoretical, or as used herein a 'predicted') x-ray signal value (referred to herein as $R_t$) can be calculated. This calculation uses the x-ray spectrum for the x-ray sensor 110, and the x-ray absorption coefficients for both the coating material 180b and the sheet material 180a of the coated substrate 180 as well as the measured weight from the second sensor signal (IR sensor or Beta gauge signals) obtained from the second sensor 120.

Quantitatively, the $R_t$ value can be calculated by a ratio of the respective values obtained using integral equations as follows:

$R_t = V^t/V_o^t$, where:

$$V_0^t = \int_o^{E_{max}} I(E) \cdot E \cdot e^{\left(-\sum_{j=1}^{n} \mu_j w_j\right)} dE$$

and $$V^t = \int_o^{E_{max}} I(E) \cdot E \cdot e^{\left(-\sum_{j=1}^{n} \mu_j w_j \sum_{i=1}^{2} \mu_i w_i\right)} dE$$

In these integral equations, I(E) is the relative x-ray tube spectral intensity at the energy "E" of the x-ray, and Emax is the maximum energy output by the x-ray tube (Tx 110a) at the applied high voltage provided by the HV PS 112.

Particularly, the sum in the first integral equation for determining $V_o^t$ is over all those materials present between the x-ray source and its detector when not measuring the sheet material (these include air and the receiver window), $\mu_j$ is the absorption coefficient of the material and $w_j$ is the weight thereof. In the second integral equation for determining $V^t$, the two measured materials (coating material and sheet material) are added into the integral in the $2^{nd}$ summation as explained below. The additional summation in the exponential absorption term contains only the weights and absorption coefficient of the two coated sheet components, namely the substrate referred to herein as the sheet material ($w_1$) and coating material ($w_2$):

$$\sum_{i=1}^{2} \mu_i w_i = \mu_1 w_1 + \mu_2 w_2$$

In case of the second sensor 120 comprises an IR sensor, the IR sensor provides the weight per unit area of the substrate ($w_1$), leaving only $w_2$ to be solved for. In case the second sensor 120 comprises a beta gauge, the summation can be re-written as:

$$\sum_{i=1}^{2} \mu_i w_i = \mu_1 w_1 + \mu_2 w_2 = \mu(w_t - w_2) + \mu_2 w_2$$

where the beta gauges provides the total weight ONO of the coated substrate 180 comprising the weight of sheet material (substrate) plus the coating material's weight, leaving once again only $w_2$ to be solved for.

Figure 2:
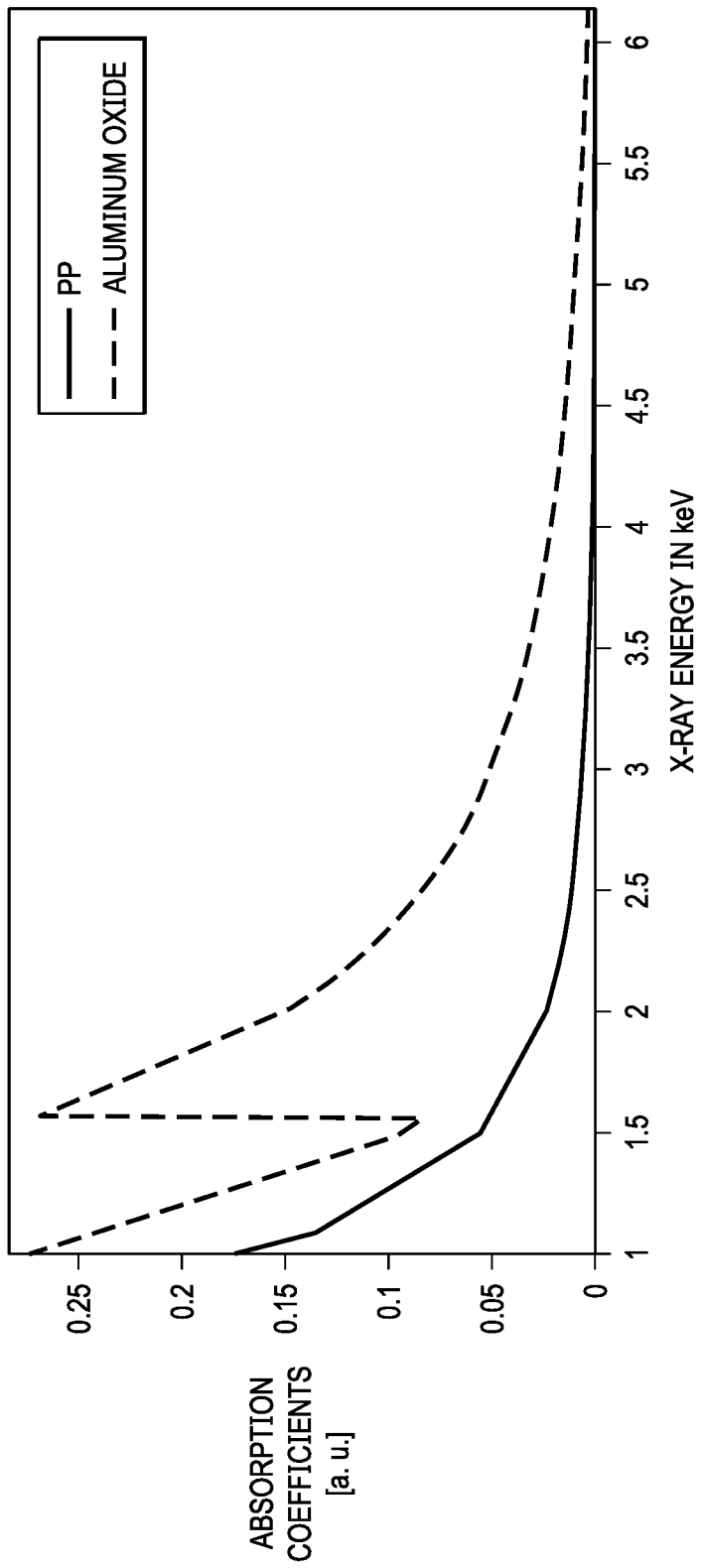
FIG. 2 shows an example plot of an x-ray absorption coefficient versus x-ray energy (in keV) for two different materials shown as PP and aluminum oxide.

FIG. 2 shows a plot of x-ray absorption coefficients versus x-ray energy (in keV) for two different materials shown by example as PP and aluminum oxide. As noted above, absorption coefficient data for a variety of materials such as this may be obtained from the public NIST database. Aluminum oxide can be seen to have a distinct relative absorption peak around 1.6 keV.

Disclosed embodiments can be applied to generally determine the respective weights of any coating material 180b on any sheet material 180a, for example a ceramic coating on a polymer substrate. The sheet material 180a can also comprise multiple layers of different polymers, for example PE/PP/PE, PP/PE/PP, PE/PP/PE/PP/PE.

EXAMPLES

A disclosed constrained x-ray based weight calculation can be performed using a "multi-dimensional minimization algorithm", such as the Levenberg-Marquart (LM) algorithm. These types of algorithms can take in the total weight of the coated substrate 180 from the second sensor 120 1 a beta gauge and a weight of the sheet material 180a (which is less than the total weight), and as an output calculates the difference between the measured x-ray signal value and the predicted x-ray signal value, which in turn, uses those NIST coefficients, knowledge of the x-ray spectrum, and knowledge of the composition of the coating material 180b and the weight obtained from the second sensor 120. These algorithms generally converge rapidly on the final weight per unit area values for the coating material 180b and for the sheet material 180a.

Regarding a reference calibration measurement using a calibration sheet, the reference calibration sheet sample is used to (a) confirm the accuracy of the x-ray sensor 110, (b) establish a simple relationship between the true and measured weight, or (c) to subtly change the input x-ray spectrum so that the match between prediction and the calibration sheet sample is essentially perfect. A number of methods can be employed to enhance the match between true and measured weights. The calibration sheet sample can introduce a linear calibration coefficient. Alternatively, the reference calibration using the calibration sheet can be used to modify the theoretical x-ray spectrum which as described above is calculated for the x-ray sensor 110. The shape of the plot of the relative number of photons versus energy will influence the x-ray sensor prediction and, as such, one can modify it to obtain agreement. This acknowledges the fact that the theoretical x-ray spectrum prediction is not perfect.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A measurement apparatus, comprising:
    an x-ray sensor including an x-ray source having a high voltage power supply coupled thereto for emitting an x-ray spectrum of x-rays and an x-ray detector for providing a measured x-ray signal value responsive to the x-rays received after being transmitted through a coated substrate comprising a sheet material including a coating material thereon;
    a second sensor comprising a beta gauge or an infrared (IR) sensor for providing a second sensor signal that includes data for obtaining a weight measure for the coated substrate comprising a total weight per unit area of the coated substrate or a total weight per unit area of the sheet material, and
    a computing device coupled to receive the measured x-ray signal value and the second sensor signal that includes a processor and a memory, wherein the processor is configured to implement an x-ray based calculation that utilizes absorption coefficients for the coating material and for the sheet material, the measured x-ray signal value, the x-ray spectrum, and the weight measure as a calculation constraint, for computing at least a weight per unit area of the coating material,
    wherein:
    the processor is further configured to calculate a predicted x-ray signal value that utilizes the absorption coefficients for the coating material and for the sheet material, the x-ray spectrum, and a composition for the coating material, and
    wherein the x-ray based calculation comprises an iterative constrained x-ray based calculation that proceeds automatically with comparisons of the measured x-ray signal value to the predicted x-ray signal value, the iterative constrained x-ray based calculation comprising:
    beginning with an initial weight per unit area for the coating material, calculating an initial predicted x-ray signal value, then comparing the initial predicted x-ray signal value to the measured x-ray sensor signal value, and
    when the initial predicted x-ray signal value is determined to not sufficiently match the measured x-ray sensor signal value, adjusting the weight per unit area for the coating material upwards in a case the measured x-ray signal value is too high relative to the initial predicted x-ray signal value or adjusts the weight per unit area for the coating material down in a case the measured x-ray signal value is too low relative to the initial predicted x-ray signal value, and then recalculating an updated predicted x-ray signal value, and repeating the comparing of the updated predicted x-ray signal value with the measured x-ray signal value, and
    repeating the adjusting of the weight per unit area of the coating material until a final predicted x-ray signal value is determined to sufficiently match the measured x-ray sensor signal value.

2. The measurement apparatus of claim 1, wherein the processor further utilizes a reference calibration measurement in the x-ray based calculation.

3. The measurement apparatus of claim 2, wherein the reference calibration measurement comprises a known basis weight measurement from a calibration sheet comprising a material similar to or identical to the coating material that is used to apply corrections to correct the x-ray spectrum.

4. The measurement apparatus of claim 1, wherein the second sensor comprises the beta gauge.

5. The measurement apparatus of claim 1, wherein the second sensor comprises the IR sensor, and wherein the weight measure comprises the weight per unit area of the sheet material.

6. The measurement apparatus of claim 1, wherein the x-ray sensor and the second sensor are within a same scanner head that is configured for scanning over the coated substrate.

7. A method, comprising:
    providing an x-ray sensor including an x-ray source having a high voltage power supply coupled thereto for emitting an x-ray spectrum of x-rays and an x-ray detector for providing a measured x-ray signal value responsive to the x-rays received after being transmitted through a coated substrate comprising a sheet material including a coating material thereon, and a second sensor comprising a beta gauge or an infrared (IR) sensor for providing a second sensor signal that includes data for obtaining a weight measure for the coated substrate comprising a total weight per unit area of the coated substrate or a total weight per unit area of the sheet material, and
    utilizing an x-ray based calculation that uses absorption coefficients for the coating material and for the sheet material, the measured x-ray signal value, the x-ray spectrum, and the weight measure as a calculation constraint, to compute at least a weight per unit area of the coating material,
    wherein the method is further configured to calculate a predicted x-ray signal value that utilizes the absorption coefficients for the coating material and for the sheet material, the x-ray spectrum of x-rays, and a composition for the coating material, and
    wherein the x-ray based calculation comprises an iterative constrained x-ray based calculation that proceeds automatically with comparisons of the measured x-ray signal value to the predicted x-ray signal value, the iterative constrained x-ray based calculation comprising:
    beginning with an initial weight per unit area for the coating material, calculating an initial predicted x-ray signal value, then comparing the initial predicted x-ray signal value to the measured x-ray sensor signal value, and when the initial predicted x-ray signal value is determined to not sufficiently match the measured x-ray sensor signal value, adjusting the weight per unit area for the coating material upwards in a case the measured x-ray signal value is too high relative to the initial predicted x-ray signal value or adjusts the weight per unit area for the coating material down in a case the measured x-ray signal value is too low relative to the initial predicted x-ray signal value, and then recalculating an updated predicted x-ray signal value, and repeating the comparing of the updated predicted x-ray signal value with the measured x-ray signal value, and repeating the adjusting of the weight per unit area of the coating material until a final predicted x-ray signal value is determined to sufficiently match the measured x-ray sensor signal value.

8. The method of claim 7, further comprising utilizing a reference calibration measurement in the x-ray based calculation, wherein the reference calibration measurement comprises a known basis weight measurement from a calibration sheet comprising a material similar or identical to the coating material that is used to apply corrections to correct the x-ray spectrum.

9. The method of claim 7, wherein the coated substrate comprises a separator membrane configured for a lithium ion battery (LiB), wherein the coating material comprises a high-z material, and wherein the sheet material comprises a polymer.

10. The method of claim 7, wherein the x-ray spectrum is calculated from fundamental physics, and wherein the absorption coefficients for the coating material and for the sheet material are obtained from a public database.

11. The method of claim 7, wherein the second sensor comprises the beta gauge.

12. The method of claim 7, wherein the second sensor comprises the IR sensor, and wherein the weight measure comprises the weight per unit area of the sheet material.

13. The method of claim 7, wherein the x-ray sensor and the second sensor are within a same scanner head that is configured for scanning over the coated substrate, further comprising scanning over the coated substrate while performing the method.

14. A measurement apparatus, comprising:
an x-ray sensor including an x-ray source having a high voltage power supply coupled thereto for emitting an x-ray spectrum of x-rays and an x-ray detector for providing a measured x-ray signal value responsive to the x-rays received after being transmitted through a coated substrate comprising a sheet material including a coating material thereon;

a beta gauge for providing a second sensor signal that includes data for obtaining a total weight per unit area for the coated substrate, and a computing device coupled to receive the measured x-ray signal value and the total weight per unit area for the coated substrate including a processor and a memory, wherein the processor is configured to implement an x-ray based calculation that utilizes absorption coefficients for the coating material and for the sheet material, the measured x-ray signal value, the x-ray spectrum, and the total weight per unit area for the coated substrate as a calculation constraint, for computing a weight per unit area of the coating material and a weight per unit area of the sheet material, wherein:

the processor is further configured to calculate a predicted x-ray signal value that utilizes the absorption coefficients for the coating material and for the sheet material, the x-ray spectrum, and a composition for the coating material, and wherein the x-ray based calculation comprises an iterative constrained x-ray based calculation that proceeds automatically with comparisons of the measured x-ray signal value to the predicted x-ray signal value, the iterative constrained x-ray based calculation comprising:

beginning with an initial weight per unit area for the coating material, calculating an initial predicted x-ray signal value, then comparing the initial predicted x-ray signal value to the measured x-ray sensor signal value, and when the initial predicted x-ray signal value is determined to not sufficiently match the measured x-ray sensor signal value, adjusting the weight per unit area for the coating material upwards in a case the measured x-ray signal value is too high relative to the initial predicted x-ray signal value or adjusts the weight per unit area for the coating material down in a case the measured x-ray signal value is too low relative to the initial predicted x-ray signal value, and then recalculating an updated predicted x-ray signal value, and repeating the comparing of the updated predicted x-ray signal value with the measured x-ray signal value, and repeating the adjusting of the weight per unit area of the coating material until a final predicted x-ray signal value is determined to sufficiently match the measured x-ray sensor signal value.

\* \* \* \* \*